(12) United States Patent
Cheung et al.

(10) Patent No.: US 7,220,019 B2
(45) Date of Patent: May 22, 2007

(54) MULTI-COLOR ILLUMINATED SIGN

(76) Inventors: Tin Fu Cheung, 310 Roy Rainey Avenue, Markham, Ontario (CA) L6E 1P3; Yaoan Ye, 29-9133 Bayview Hill, Richmond Hill, Ontario (CA) L4B 4C5

( * ) Notice: Subject to any disclaimer, the term of this patent is extended or adjusted under 35 U.S.C. 154(b) by 247 days.

(21) Appl. No.: 11/121,410

(22) Filed: May 5, 2005

(65) Prior Publication Data
US 2006/0248761 A1     Nov. 9, 2006

(51) Int. Cl.
*F21V 11/00*     (2006.01)
(52) U.S. Cl. ................ 362/235; 362/246; 362/812
(58) Field of Classification Search ........... 362/602, 362/558–559, 560, 613, 235, 248, 812; 40/541, 40/546
See application file for complete search history.

(56) References Cited

U.S. PATENT DOCUMENTS

| | | | |
|---|---|---|---|
| 4,177,506 A | * 12/1979 | Easterling | ............ 362/414 |
| 4,611,265 A | * 9/1986 | Davis | ............ 362/145 |
| 5,365,411 A | * 11/1994 | Rycroft et al. | ............ 362/20 |
| 5,954,423 A | * 9/1999 | Logan et al. | ............ 362/235 |
| 6,000,812 A | * 12/1999 | Freeman et al. | ............ 362/249 |
| 6,415,531 B1 | * 7/2002 | Ohtsuki et al. | ............ 36/31 |

* cited by examiner

*Primary Examiner*—Ali Alavi
(74) *Attorney, Agent, or Firm*—David W. Wong

(57)     ABSTRACT

The multi-color illuminated sign displays an indicia or house address number in changing sequence of colors. The back lighting is provided by three groups of plurality of light emitting diodes. One group of the light emitting diodes is operative to generate a primary blue light, a second group of light emitting diodes is operative to generate a primary green light, and a third group of light emitting diodes is operative to generate a primary red light. Varying combinations of these primary lights produces a plurality of color back lighting which are reflected and refracted by various reflective and refractive patterns to enhance the visibility and aesthetic appearance of the indicia.

17 Claims, 8 Drawing Sheets

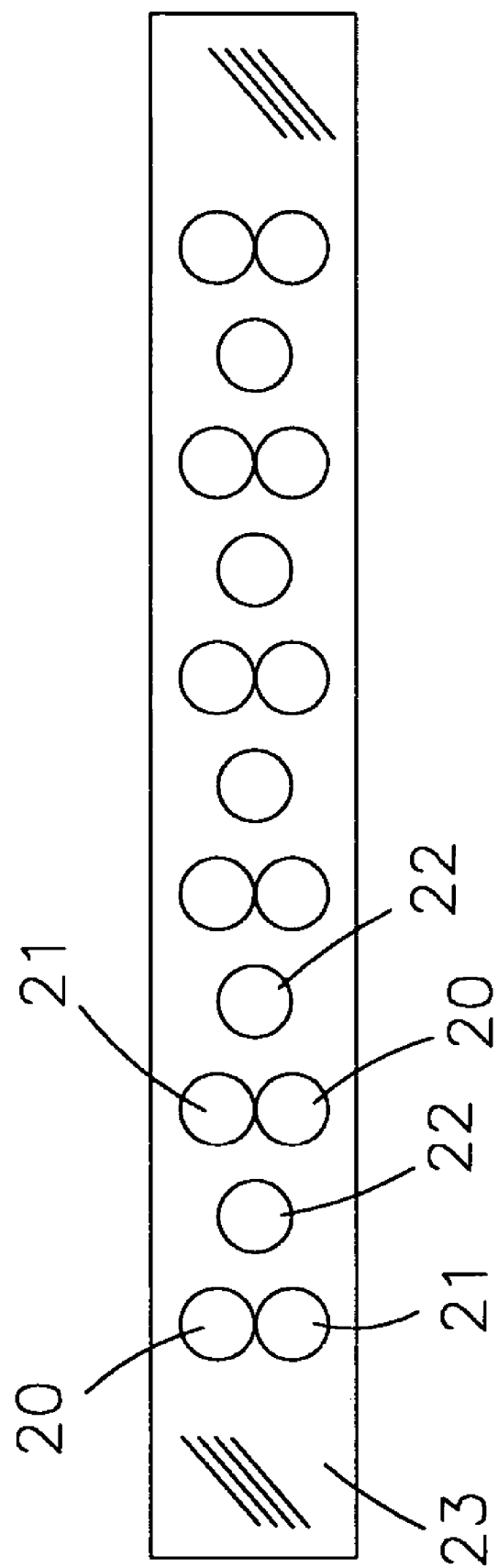

MULTI-COLOR ILLUMINATED SIGN

BACKGROUND OF THE INVENTION

1. Field of the Invention

This invention relates to an illuminated sign and more particularly relates to a house address number sign which has variable and changing multi-color illumination after dark to provide a high visibility as well as a desirable aesthetic appearance.

2. Background Art

Illuminated signs are provided such that the indicia of the signs will become clearly visible after dark. The indicia is commonly mounted at the front of an enclosure with a light source, such as an electrical light bulb, located within the enclosure behind the sign. The light source is turned on at night or when the ambient lighting is below a certain level so as to provide a back light for illuminating the indicia Illuminated house address number signs are particularly useful for rendering the house address number visible after dark. However, due to the relatively short life span of the incandescent light bulb used as a back light source, it requires changing from time to time. Since a house address number sign is normally required to be mounted at a high location on the front wall of the house in order that it can be clearly visible at a far distance, it is awkward and troublesome to change the light bulb at such high location. Also, incandescent lights have a high electrical power consumption. Attempts have been made by providing long life and low electrical consumption light emitting diode (LED) lights as a light source to alleviate the above problems. A plurality of LED lights are mounted on a support plate located behind the indicia with the LED lights arranged in the same pattern as the indicia so that when the LED lights are turned on they present an illuminated indicia or number. A main drawback of such construction is that when one or several LED lights become inoperative, the indicia becomes unevenly illuminated such that the indicia or number is no longer clearly legible or identifiable. Some LED light illuminated signs resolve the above problem by mounting a plurality of LED lights on the side walls of the enclosure such that the indicia is illuminated by reflected light from the LED lights. However, the reflection means are not effective in providing a strong desirable illumination of the indicia. Furthermore, only LED lights providing lighting of a single color are provided such that the illumination is not attractive, and the sign does not provide any aesthetic value to the house.

SUMMARY OF THE INVENTION

It is the primary object of the present invention to provide an attractive illuminated sign.

It is another object of the present invention to provide an illuminated house number sign having a high illumination such that the indicia of the sign is clearly and unmistakably visible even at a far distance.

It is another object of the present invention to provide an illuminated house number sign which operates with changing multi-color illumination for providing a high aesthetic appearance.

It is another object of the present invention to provide an illuminated house number sign which has a plurality of illuminating light resulting from numerous variable combinations of color lights reflected from a plurality of primary color lights generated from a plurality of LED lights.

It is yet another object of the present invention to provide an illuminated house number sign having effective light reflection means for providing an even and bright back lighting of the indicia.

BRIEF DESCRIPTION OF THE DRAWINGS

Other objects and advantages of the present invention will become apparent from the following detailed description of the preferred embodiments thereof in connection with the accompanying drawings in which

FIG. 6A is an enlarged isolated view of the LED light mounting board showing the preferred arrangement of the different color LED lights according to the present invention.

DETAILED DESCRIPTION OF THE PREFERRED EMBODIMENTS

Figure 1:
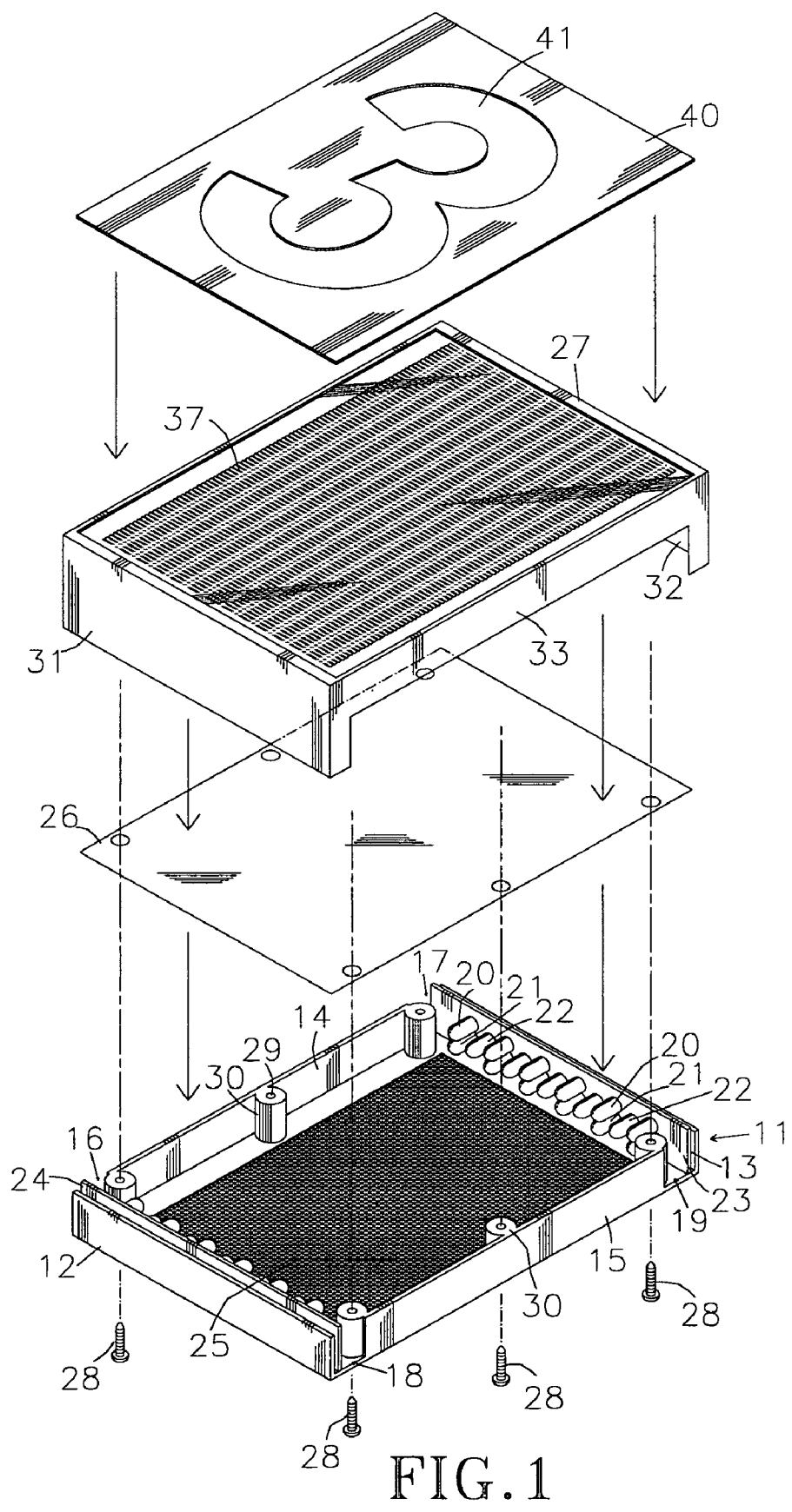
FIG. 1 is an exploded front elevation of the house number sign according to the present invention.
Figure 2:
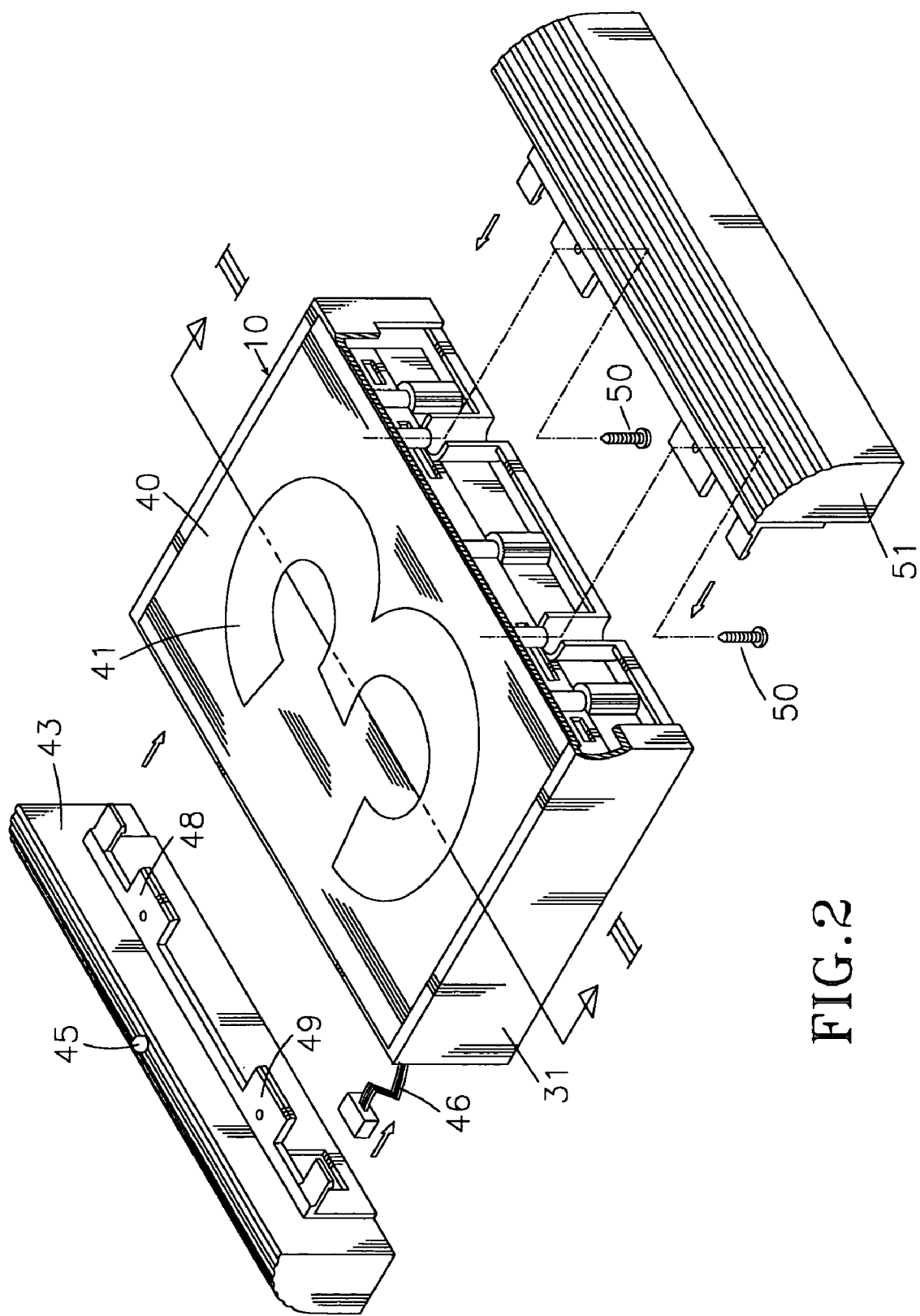
FIG. 2 is a top front perspective elevation view of the two house number signs and control housings mounted side by side according to the present invention.

With reference to the accompanying drawings in which like reference numerals designate corresponding parts in the several views, the illuminated house number sign according to the present invention has a main housing 10 which includes a rectangular lower casing 11 having two upstanding opposite end walls 12 and 13, and two opposite upstanding side walls 14 and 15. The inside surface of the side walls 14 and 15 are preferably provided with a light reflective coating. Two access gaps 16 and 17 are located between the ends of the side wall 14 and the end wall 12 and end wall 13 respectively and two additional access gaps 18 and 19 are located between the ends of the side wall 15 and the end wall 12 and end wall 13 respectively. Groups of three LED lights consisting of an LED light 20 operative to generate a primary green light, an LED light 21 operative to generate a primary blue light, and an LED light 22 operative to generate a primary red light are mounted in three parallel spaced rows on a printed circuit board 23 which is mounted adjacent to and spaced from the end wall 13 with the LED lights pointing inwards towards the interior of the enclosure such that the three primary color lights generated are directed into the interior of the casing 11. Preferably, the green LED lights 20 and the blue LED lights 21 are located aligned and opposite to one another in a first and second rows with either the first row or the second row located adjacent to the reflective plate 25. The red LED lights 22 are located in a middle row located between the first and second rows and at an offset positions from the green LED lights 20 and blue LED lights 21. Alternatively, as best shown in FIG.

6A, the green LED lights 20 and the blue LED lights 21 may be located at alternate positions in both the first and second rows. Similar groups of three LED lights operative to generate similar three primary green, blue and red color lights are mounted on a second printed circuit board 24 which is located adjacent to and spaced from the end wall 12 such that the lights generated by the second groups of three LED lights are also directed into the interior of the casing 11. LED lights have a long operation life span and they have a very low electrical power consumption.

Figure 7:
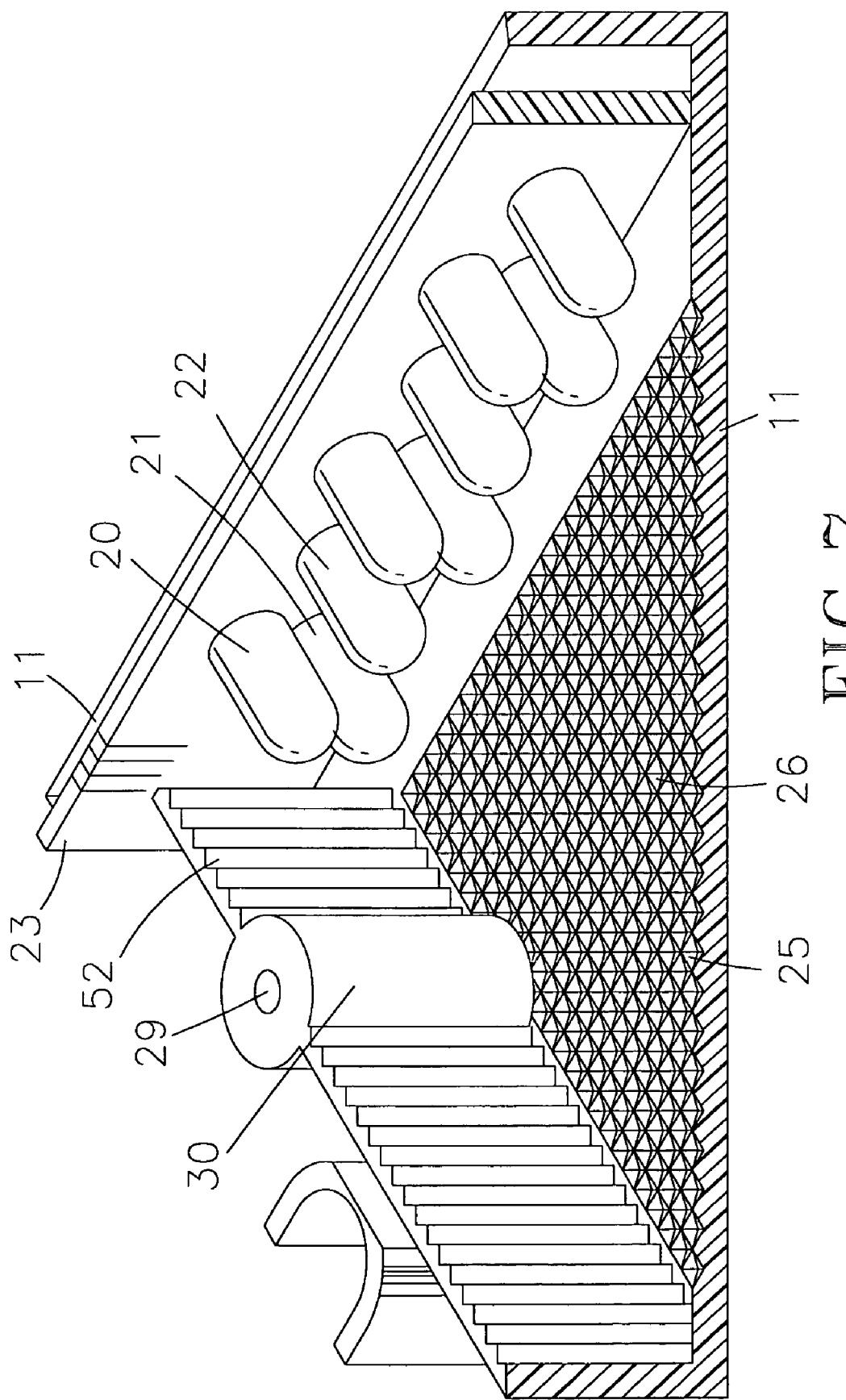
FIG. 7 is an enlarged isolated top front elevation view of the lower enclosure of the second embodiment.

A light reflective plate 25 is mounted on the bottom panel of the casing 11. The reflective plate 25 has a light scattering reflective pattern 26 formed therein. The light scattering reflective pattern 26 may be in the form of a plurality of inverted pyramidal depressions as best shown in FIG. 7. Alternatively, the light scattering reflective pattern 26 may be integrally formed directly in the bottom panel of the casing 11. Other light scattering reflective patterns such as pyramidal protrusions or similar multi-sided depressions or protrusions may be provided for the same purposes. The surface of the light scattering reflective pattern may also be coated with a light reflective coating, such as a chrome coating.

A light diffusing plate 26 in the form of a thin translucent plastic sheet such as a polyester film with a light diffusing coating or ground glass is located over the casing 11 and a front cover casing 27 is mounted over the top of the casing 11 to sandwich the light diffusing plate 26 in place. The front cover casing 27 is mounted to the casing 11 with screws 28 through threaded openings formed at the bottom of the casing 11 and the underside of the edge portions of the front cover casing 27. The screws 28 extends through openings 29 of mounting posts 30 formed integrally in the casing 11.

The front cover casing 27 has two end walls 31 and 32 adapted to cover over the end walls 12 and 13 of the casing 11, and two side walls 33 and 34 are adapted to cover over the side walls 15 and 14 respectively of the casing 11. The side wall 33 has a rectangular cut out 35 formed in its lower edge portion, similarly the side wall 34 has a similar rectangular cut out 36 formed in its lower edge portion. The cut outs 35 and 36 provide two elongated openings at the two sides of the sign for electrical connection wiring to LED lights as well as means for mounting a plurality of signs side by side.

The front cover casing 27 has a transparent front panel 37 which has a slightly recessed rectangular depression from the top edge portions of the front cover casing 27. A light refractive pattern 38 is formed at the underside of the front panel 37. The light refractive pattern 38 may be in the form of a plurality of parallel grooves 39 having a V-shaped cross section.

An opaque indicia sheet 40 with the desired number 41 formed therein is mounted over the front panel 37 such as by snap-engagement with grooves formed in the inner side walls of the edge portions of the recessed depression on the front panel 37 or mounted thereon with adhesive. The desired number 41 may be formed by a transparent pattern or cut out formed in the indicia sheet 40 such that it will be illuminated during operation by the back lighting generated by the LED lights in the main housing 10. Alternatively, the background may be made transparent and the desired number is opaque such that the background is illuminated during operation. Also, the transparent portion of the indicia sheet 40 may be tinted such that the indicia may provide a distinctive appearance during day light hours when the LED lights are not actuated. Also, the front panel 37 of the front cover casing 27 may be tinted and the opaque background of the indicia sheet 40 is white color such that the indicia would be clearly visible in day light because of the contrasting color from the background.

The power source 42 such as a battery pack or a transformer connected to the AC household electric supply for operating the LED lights 20, 21 and 22 are housed in an auxiliary housing 43. An electrical control circuit 44 is connected between the power source 42 and the LED lights 20, 21 and 22 to control the operation of the latter. A light sensor 45 connected to the control circuit 44 operates to actuate the operation of the control circuit 44 as soon as the ambient light falls below a predetermined level. Electrical connecting wiring 46 with a connector 47 provides the electrical connection between the control circuit 44 and the LED lights 20, 21 and 22 in the main housing 10. The auxiliary housing 43 is mounted to the main housing 10 with extension arms 48 and 49 insertable through the side openings of the main housing 10 formed by the cut out edge portions of the side wall 34 of the front cover casing 27 and they are mounted to the front cover casing 27 with screws 50 through the bottom of the casing 11. A plurality of main housings 10 of signs may be mounted together side by side to provide the desired house number which has more than one digit with mounting plates similar to extension arms 48 and 49 inserted between the several main housings and secured in place with screws in the same manner. A second auxiliary housing 51 similar in construction to auxiliary housing 50 may be mounted to the other side of the main housing 10 to cover the other side opening. Additional power supply or electrical controls may be housed in the second auxiliary housing 51 if required.

Figure 6:
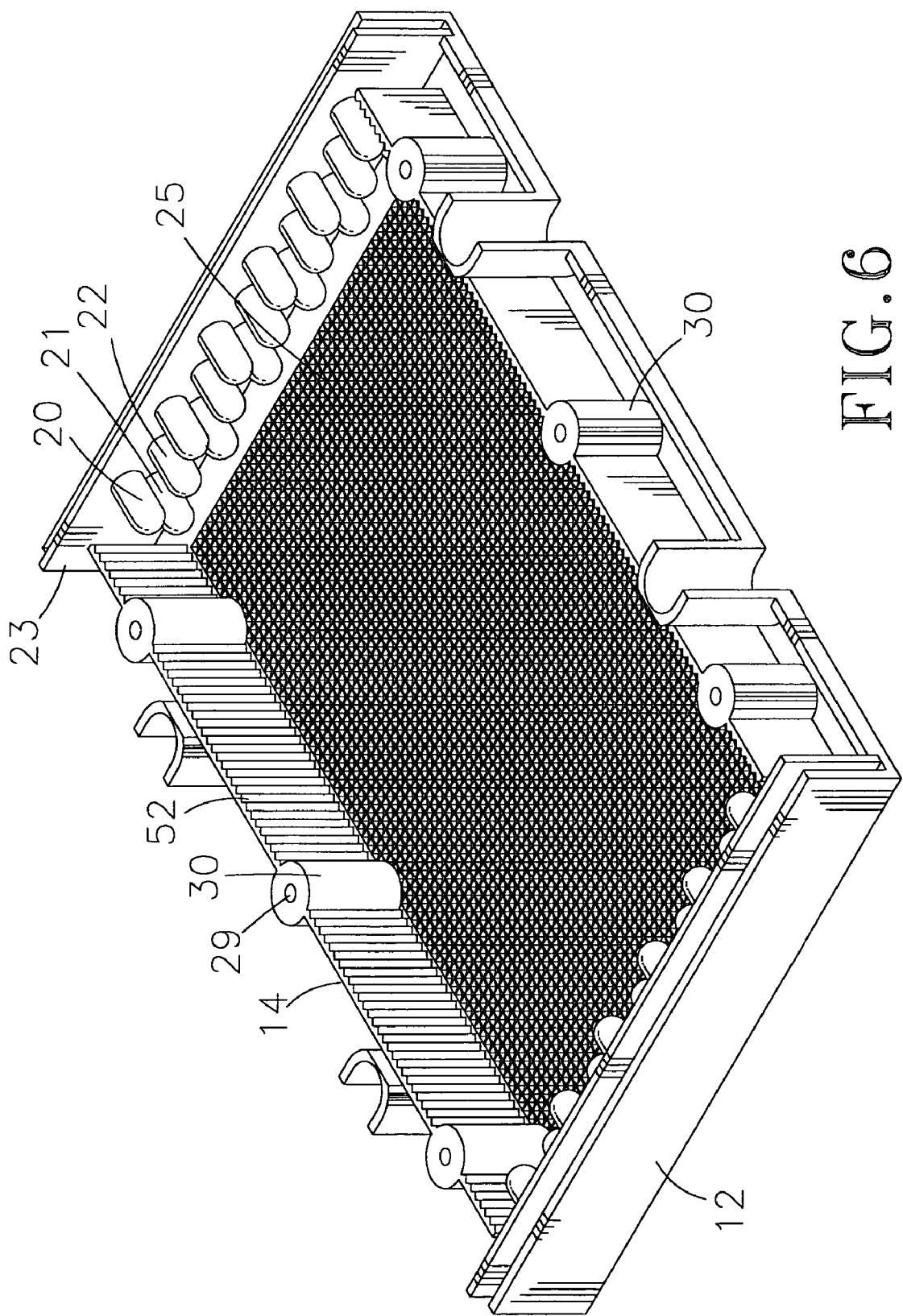
FIG. 6 is an enlarged top front elevation view of the lower enclosure of a second embodiment of the house number sign having additional reflective means mounting on the side wall therein.

A second and preferred embodiment of the casing 11 is shown in FIG. 6, in which a plurality of parallel vertical grooves 52 having a V-shaped cross section are formed on the inner surface of the side walls 14 and 15.

Figure 3:
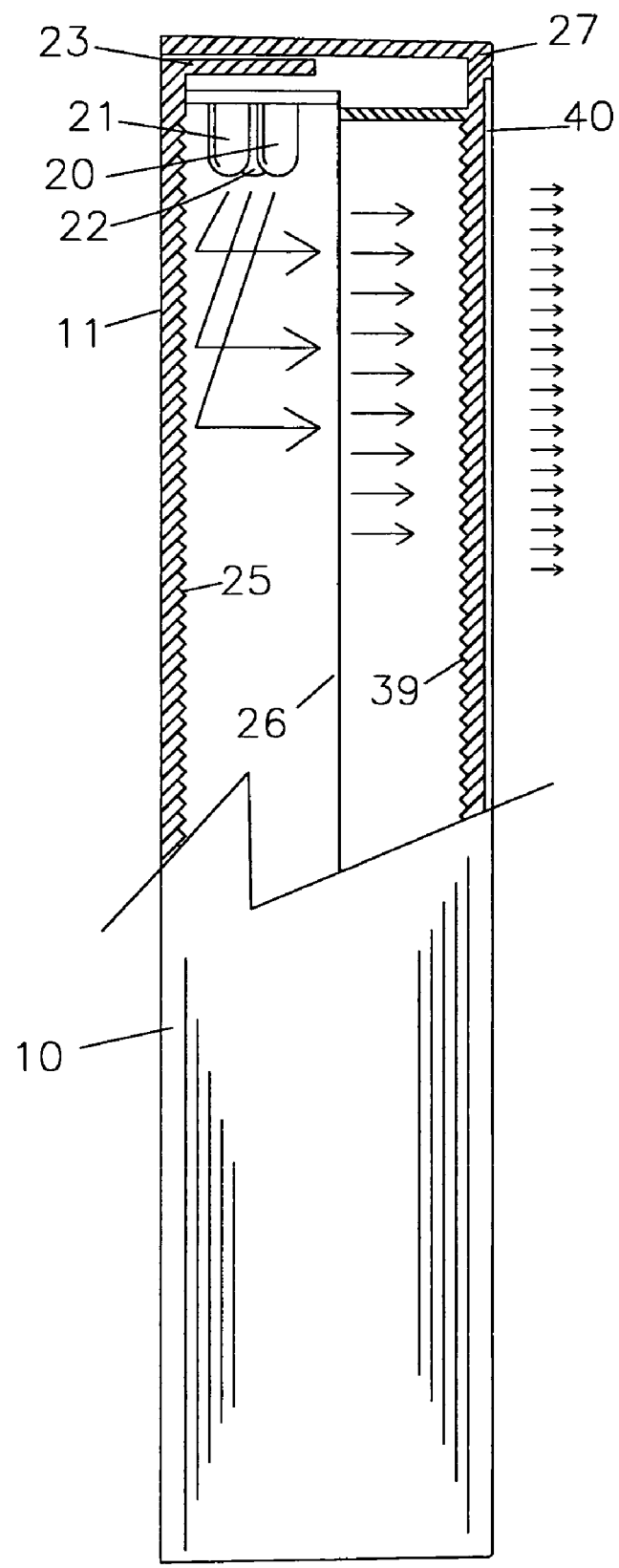
FIG. 3 is a partial side sectional elevation view along section line III—III of FIG. 2.
Figure 4:
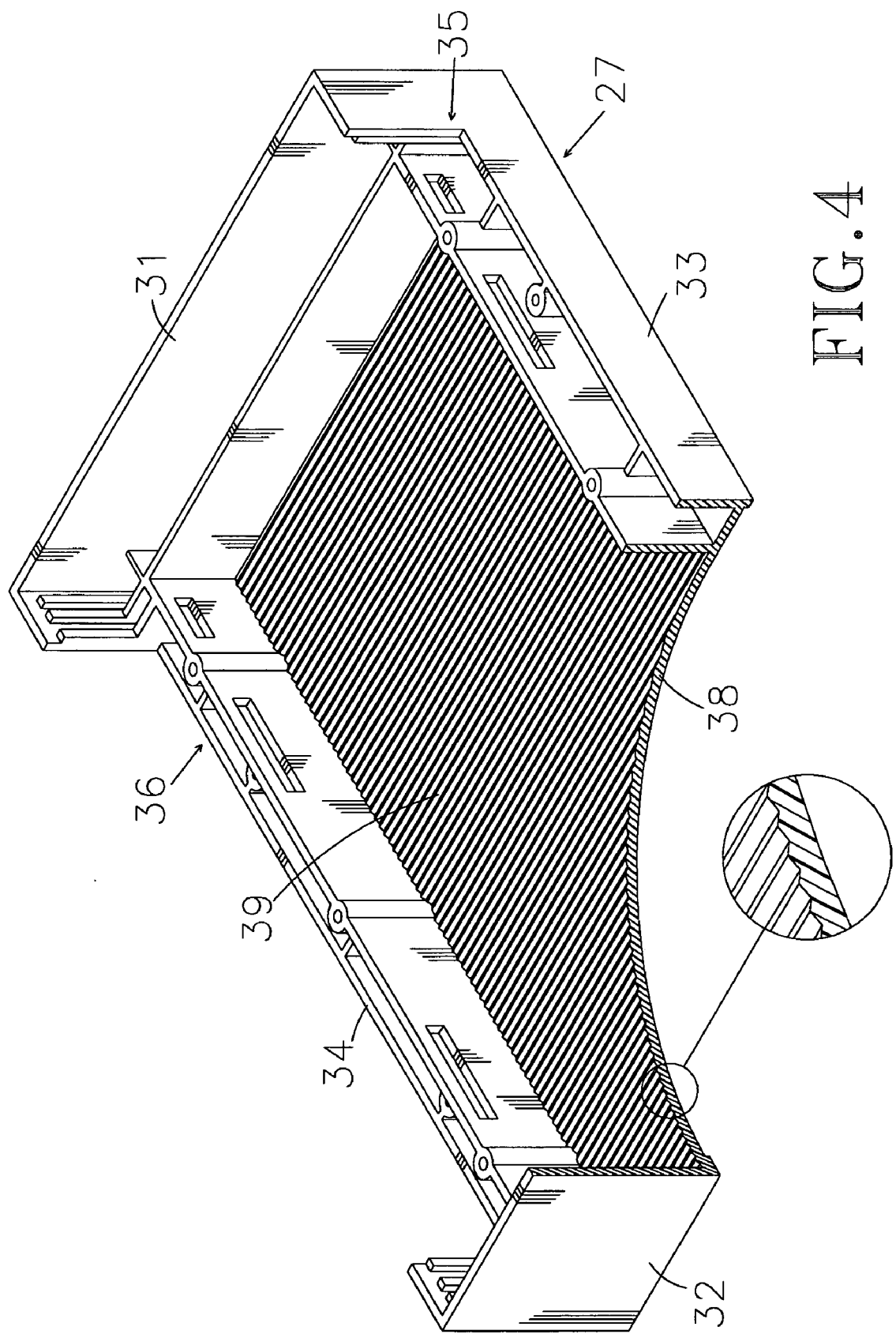
FIG. 4 is a perspective bottom view of the top cover of the main housing of the house number sign according to the present invention with the top cover turned up side down.
Figure 5:
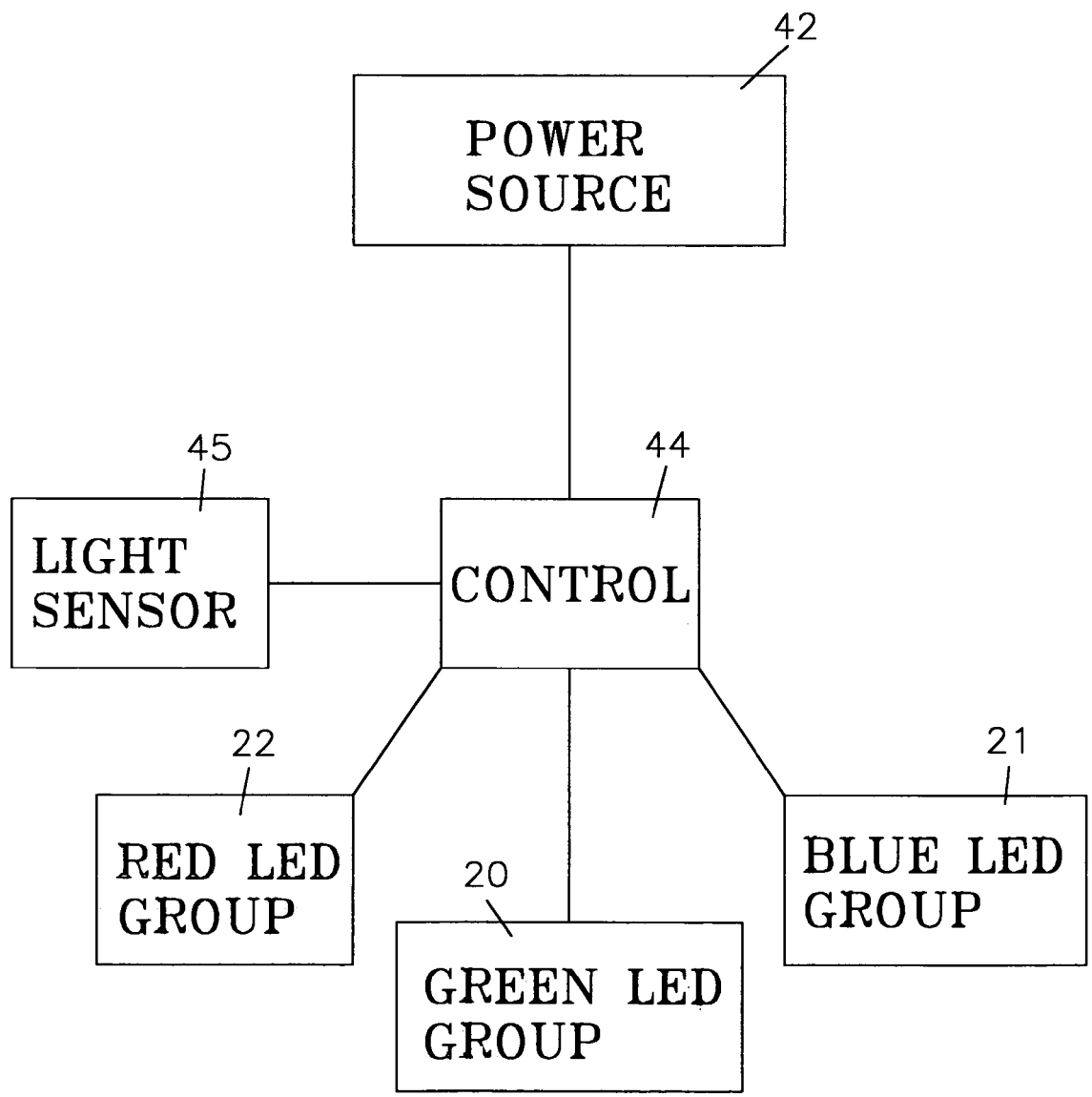
FIG. 5 is a schematic block diagram showing the operation of the house number sign according to the present invention.

In operation, the control circuit 44 is operative to turn on in a predetermined program sequence the LED lights of one color or combinations of two or three colors as soon as the ambient light falls below a predetermined low light level detected by the light sensor 45. The varying combinations of the lights of these primary colors produce numerous resulting changing color lights within the main housing 10. The changing lights are reflected by the inner surface of the side walls 14 and 15 as well as reflected and refracted by the bottom panel 25 towards the front panel 37 after being diffused by the diffusing plate 26 as best shown in FIG. 3. The diffused light is further scattered by the refractive pattern 26 formed on the under surface of the front panel 37 to produce an attractive sparkling light that illuminates the house number 41 of the indicia plate 40. Thus, the house number 41 will become visible with the changing attractive color lights to provide an aesthetic display of the indicia.

The additional reflective vertical grooves 52 formed on the inner surface of the side walls 14 and 15 enhances the mixing process of the various color lights generated by the LED lights of the three primary colors.

While the present invention has been shown and described in the preferred embodiments thereof, it will be apparent that various modifications can be made therein without departing from the spirit or essential attributes thereof, and it is desired therefore that only such limitations be placed thereon as are imposed by the appended claims.

What we claim is:

1. A multi-color illuminated sign comprising:
   a rectangular base casing having upstanding opposite end walls and side walls, and a bottom panel, said side walls having a light reflective inner surface, said bottom panel having a light scattering reflective pattern formed therein, a plurality of light emitting diodes mounted on a circuit board located adjacent to an end wall wherein said plurality of light emitting diodes including a first group of light emitting diodes operative to emit a primary blue light in said base casing, a second group of light emitting diodes operative to emit a primary green light in said base casing, and a third group of light emitting diodes operative to emit a primary red light in said base casing, a front cover casing mounted on top of said base casing, said front cover casing having a top panel with a smooth upper surface, a light diffusing plate mounted between said front cover casing and said base casing, an indicia plate having a transparent display indicia formed therein, mounted over said top surface of said front cover casing.

2. A multi-color illuminated sign according to claim 1 wherein said front cover casing has an undersurface with a light refractive pattern formed therein and said light diffusing plate is a translucent plate.

3. A multi-color illuminated sign according to claim 2 wherein said light scattering reflective pattern in said bottom panel of said base casing is a plurality of reversed pyramidal depressions and said light refractive pattern on the underside of said top cover casing is a plurality of parallel cross sectional V-shaped grooves.

4. A multi-color illuminated sign according to claim 3 wherein said display indicia is a numeral formed by a cut-out pattern removed from said indicia plate.

5. A multi-color illuminated sign according to claim 4 including a second plurality of light emitting diodes mounted on a second circuit board located adjacent to the other end wall of said base casing, said second plurality of light emitting diodes also including a first group of light emitting diodes operative to emit a primary blue light in said base casing, a second group of light emitting diodes operative to emit a primary green light in said base casing, and a third group of light emitting diodes operative to emit a primary red light in said base casing.

6. A multi-color illuminated sign according to claim 5 wherein said light emitting diodes are arranged in three spaced parallel rows with said first group of light emitting diodes and said second group of light emitting diodes located at aligned and opposite positions of one another in a first row and a second row with said first row and said second row selectively located adjacent to said bottom panel, and said third group of light emitting diodes are located in a middle row located between said first row and said second row and at offset positions from said first group of light emitting diodes and said second group of light emitting diodes.

7. A multi-color illuminated sign according to claim 6 including an electrical power supply connected to said first plurality of light emitting diodes and said second plurality of light emitting diodes, a control device connected between said power supply and said first plurality of light emitting diodes and second plurality of light emitting diodes and adapted to actuate said first plurality of light emitting diodes and second light emitting diodes for generating changing color lighting in a predetermined programmed sequence in said base casing of a single primary color, a combination of two primary colors, and a combination of three primary colors.

8. A multi-color illuminated sign according to claim 7 including a light sensor connected to said control device and adapted to actuate said control device when ambient light condition around said sign falls below a predetermined level.

9. A multi-color illuminated sign according to claim 8 wherein said power supply, said control device and said light sensor are located in an auxiliary housing mounted adjacent to a side wall of said sign.

10. A multi-color illuminated sign according to claim 9 wherein said inner surface of side walls of said base casing has a plurality light reflective parallel cross sectional V-shaped grooves formed therein and said power supply is a power transformer electrically connected to an alternating current supply.

11. A multi-color illuminated sign comprising:
a rectangular base casing having upstanding opposite end walls and side walls, and a bottom panel, said side walls having a light reflective inner surface with a plurality of parallel cross sectional V-shaped groove formed therein, and said bottom panel having a light scattering reflective pattern formed therein, a plurality of light emitting diodes mounted in three parallel spaced rows on a circuit board located adjacent to and end wall wherein said light emitting diodes including a first group of light emitting diodes operative to emit a primary blue light in said base casing and a second group of light emitting diodes operative to emit a primary green light in said base casing, said first group of light emitting diodes and said second group of light emitting diodes being located at alternate evenly spaced positions in said first row and said second row, a third group of light emitting diodes operative to emit a primary red light in said base casing and arranged in an evenly spaced manner in a third row of said three parallel rows, said third group of light emitting diodes being positioned at offset positions from said first group of light emitting diodes and said second group of light emitting diodes, a front cover casing mounted on top of said base casing, said front cover casing having a top panel with a smooth upper surface, and an under surface having a light refractive pattern formed therein, a light diffusing plate mounted between said front cover casing and said base casing, an indicia plate mounted on said upper surface of said front cover casing, said indicia plate having a transparent display indicia formed therein.

12. A multi-color illuminated sign according to claim 11 wherein said display indicia is a numerical cut out pattern formed in said indicia plate.

13. A multi-color illuminated sign according to claim 12 wherein said light reflective pattern in said bottom panel of said base casing is a plurality of inverted pyramidal depressions and said top panel of said front cover casing is a tinted translucent panel.

14. A multi-color illuminated sign comprising:
at least two rectangular main housings mounted together side by side wherein each housing including a rectangular base casing having two opposite light reflective end walls and side walls, and a light reflective bottom panel, a plurality of parallel cross sectional V-shaped grooves formed on an inner surface of said side walls, a plurality of inverted pyramidal depressions formed in said bottom panel, a first plurality of light emitting diodes mounted on a first circuit board located adjacent to one end wall inside said rectangular base casing, said first plurality of light emitting diodes including a plurality of a first group of light emitting diodes operative to emit a primary green light within said base casing, a second group of light emitting diodes operative to emit a primary blue light within said base casing, and a third group of light emitting diode operative to emit a primary red light within said base casing, a second plurality of light emitting diodes mounted on a second circuit board located adjacent to the other end wall of said rectangular base casing, said second plurality of light emitting diodes also including a plurality of first group of light emitting diodes operative to emit a primary green light together with said first group of light emitting diodes mounted on said first circuit board, a plurality of second group of light emitting diodes operative to emit a primary blue light together with said second group of light emitting diodes mounted on said first circuit board, and a third group of light emitting diodes operative to emit a primary red light together with said third group of light emitting diodes mounted on said first circuit board, a front cover casing mounted on top of said base casing, said front cover casing having two opposite end walls juxtaposed to and covering over said end walls of said base casing, and two side walls having a rectangular cut out formed in a central edge portion therein, said front cover casing having a transparent front panel, a shallow rectangular depression formed in a front surface of said front panel, a light diffusing plate mounted between said front cover casing and said base casing, an indicia plate having an indicia formed therein mounted in said shallow rectangular depression of said front panel.

15. A multi-color illuminated sign according to claim 14 including a control device located in an auxiliary housing mounted to an exposed side wall of said front cover casing, said control device being connected to an electrical power source and said first plurality of light emitting diodes and said second plurality of light emitting diodes and being operative to actuate said first plurality of light emitting diodes and said second plurality of light emitting diodes to generate a predetermined sequence of changing color lights in said main housing of a single primary color, a combination of two or three primary colors for illuminating said indicia.

16. A multi-color illuminated sign according to claim 15 including a light sensor connected to said control device for operating said control device at a predetermined ambient light condition.

17. A multi-color illuminated sign according to claim 16 wherein said indicia is a cut out numerical pattern formed in said indicia plate.

* * * * *